INVENTOR.
ANDREW J. COLMERAUER
BY Francis D. Ammen
ATTORNEY

Dec. 20, 1955     A. J. COLMERAUER     2,727,607
VARIABLE SPEED TRANSMISSION APPARATUS
Filed Sept. 23, 1950     4 Sheets-Sheet 3

INVENTOR.
ANDREW J. COLMERAUER
BY
Francis D. Ammen
ATTORNEY

Dec. 20, 1955     A. J. COLMERAUER     2,727,607
VARIABLE SPEED TRANSMISSION APPARATUS
Filed Sept. 23, 1950     4 Sheets-Sheet 4

INVENTOR.
ANDREW J. COLMERAUER
BY
ATTORNEY

United States Patent Office 2,727,607
Patented Dec. 20, 1955

2,727,607

VARIABLE SPEED TRANSMISSION APPARATUS

Andrew J. Colmerauer, Redondo Beach, Calif., assignor of one-fourth each to Mary E. Colmerauer, Leo T. Langer and Esther C. Langer, both of Long Beach, Calif.

Application September 23, 1950, Serial No. 186,467

11 Claims. (Cl. 192—61)

This invention relates to variable speed transmission apparatus or mechanism.

When a rotary driving member is coupled up to a load, it usually happens that the torque necessary to start the movement of the load and accelerate it to normal running speed is relatively great. Such condition exists in many situations, including a power plant for an automobile, such as an automobile truck or passenger car.

One of the objects of this invention is to provide simple mechanism for transmitting sufficient torque to the driven member or shaft when the drive starts, to overcome the inertia of the load and commence acceleration, and to provide a control for the transmission which will enable the speed of rotation of the driven mechanism or vehicle to be gradually increased.

Another object of the invention is to provide means whereby, at the end of the controlled transmitted movement, a positive clutch connection may be automatically established, giving a one-to-one ratio of transmission through the device to the driven mechanism or driven shaft.

The invention involves the use of hydraulic mechanism in which a liquid is employed, and impelled, or propelled, by pumps, and with which is associated controlled means for more or less restricting the flow of the liquid in the outlets from the impelling mechanism.

The action of the control means when the drive is started, is to slightly restrict the flow of the liquid through the outlets from the impelling mechanism. This operates to transmit a relatively low speed drive from the prime mover to the driven member or shaft, to start moving the load. In other words, the control is such that the driven member at the start is driven at a relatively slow speed and as the speed of the driven load, for example, a car accelerating from a standing position, gradually increases, the control is applied to increase the speed up to normal running speed.

One of the objects of this invention is to provide means operating automatically at the end of the operation of the control, to effect a positive clutch connection between the driven member and the driving member so that from that point on the drive is effective at a one-to-one ratio.

Another object of the invention is to provide means whereby the hydraulic transmission mechanism can be driven in reverse by the load, the movement of which is being "decelerated," or retarded, so that the transmission mechanism performs the function of brake mechanism. For example: If the invention is applied in the power plant of an automobile, it can be set in such a way that when the car is descending a hill, the transmission mechanism will act as a brake to prevent too great acceleration of the car.

Another object of the invention is to produce a transmission mechanism, including a casing, or housing, for the gearing of the mechanism that can readily be connected into shafting so that it will be capable of receiving the drive through the casing, and which will have the effect of a flywheel, with reduced inertia when the drive starts but having a relatively high momentum when the casing is running at its normal, or high, speed.

Another object of the invention is to provide the transmission with parts capable of functioning to develop a braking effort. This feature adapts the mechanism specially for use in the power plant of a car, as it can supplement the usual brake mechanism when the car is running down a hill, by developing resistance to the natural acceleration of the car. The use of this feature considerably reduces the wear on the brake linings of the car.

Another object of the invention is to provide the casing with features of construction that will enable all the gearing of the mechanism to be constantly immersed in a liquid lubricant; also to provide a construction for the casing that will enable it to be mounted on a horizontal seat or a seat that is in a substantially vertical plane.

In its preferred embodiment the apparatus includes a drum containing the operating liquid for the pumps. When this drum is rotating at a high speed the liquid within it is subjected to considerable centrifugal force.

One of the objects of the present invention is to provide means associated with this drum for utilizing the centrifugal force to insure an ample supply of the operating liquid to the pump inlets; also to provide a reservoir of relatively large capacity to hold substantially all of the operating liquid that is not passing through the pump chamber, and to give this reservoir a considerable diameter to enable the mass of liquid within it to reproduce the functional effects of a fly wheel having substantially the diameter and weight of the liquid that fills this reservoir; and to provide for conducting heat from the oil or other liquid in the reservoir and the outer side of the drum that carries the mass of liquid.

Further objects of the invention will appear hereinafter.

The invention consists in the novel parts and combination of parts to be described hereinafter, all of which contribute to produce an efficient transmission mechanism.

A preferred embodiment of the invention is described in the following specification, while the broad scope of the invention is pointed out in the appended claims.

Figure 1:
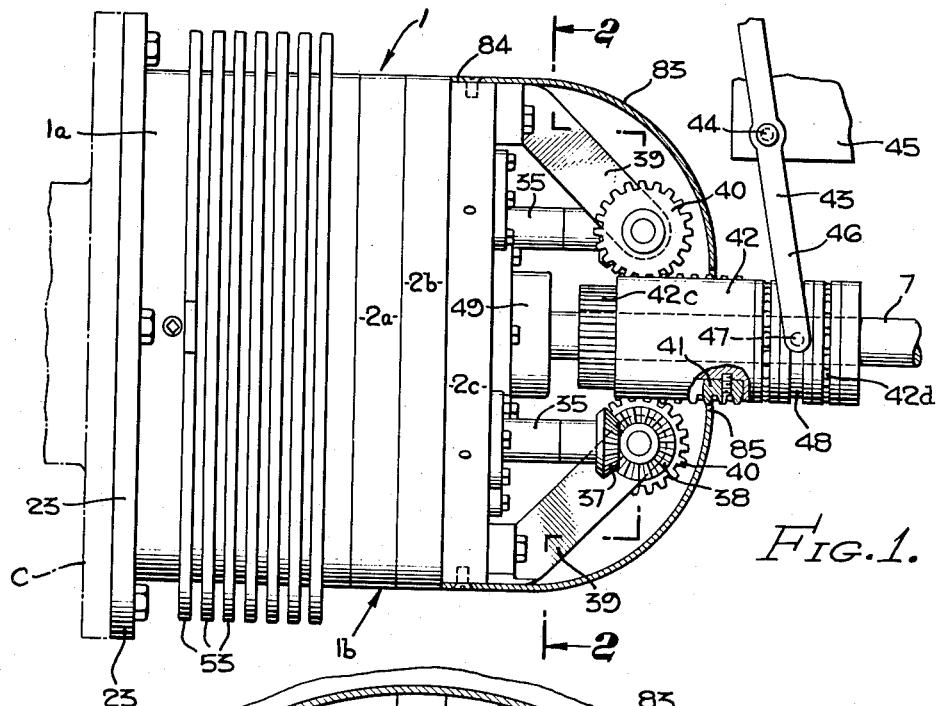
Fig. 1 is a side elevation of a portion of the casing and shows a hood or housing for some of the control mechanism, in section, so as to disclose some of its detail. In this view a portion of the control sleeve for the control mechanism is illustrated broken away, as is, also, the driven shaft.
Figure 2:
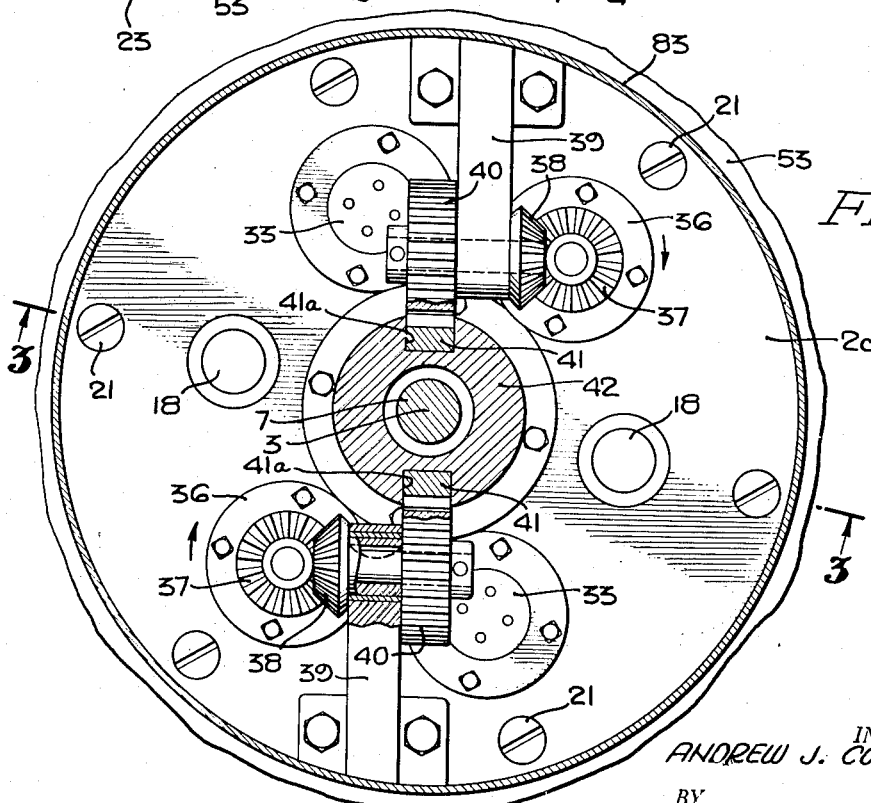
Fig. 2 is a vertical cross section taken about on the line 2—2 of Fig. 1. This view further illustrates the control sleeve on the driven shaft and the means whereby the shifting movement of this sleeve is imparted by the control devices or valves that control the flow of the hydraulic liquid through the outlets from the impelling mechanism.
Figure 3:
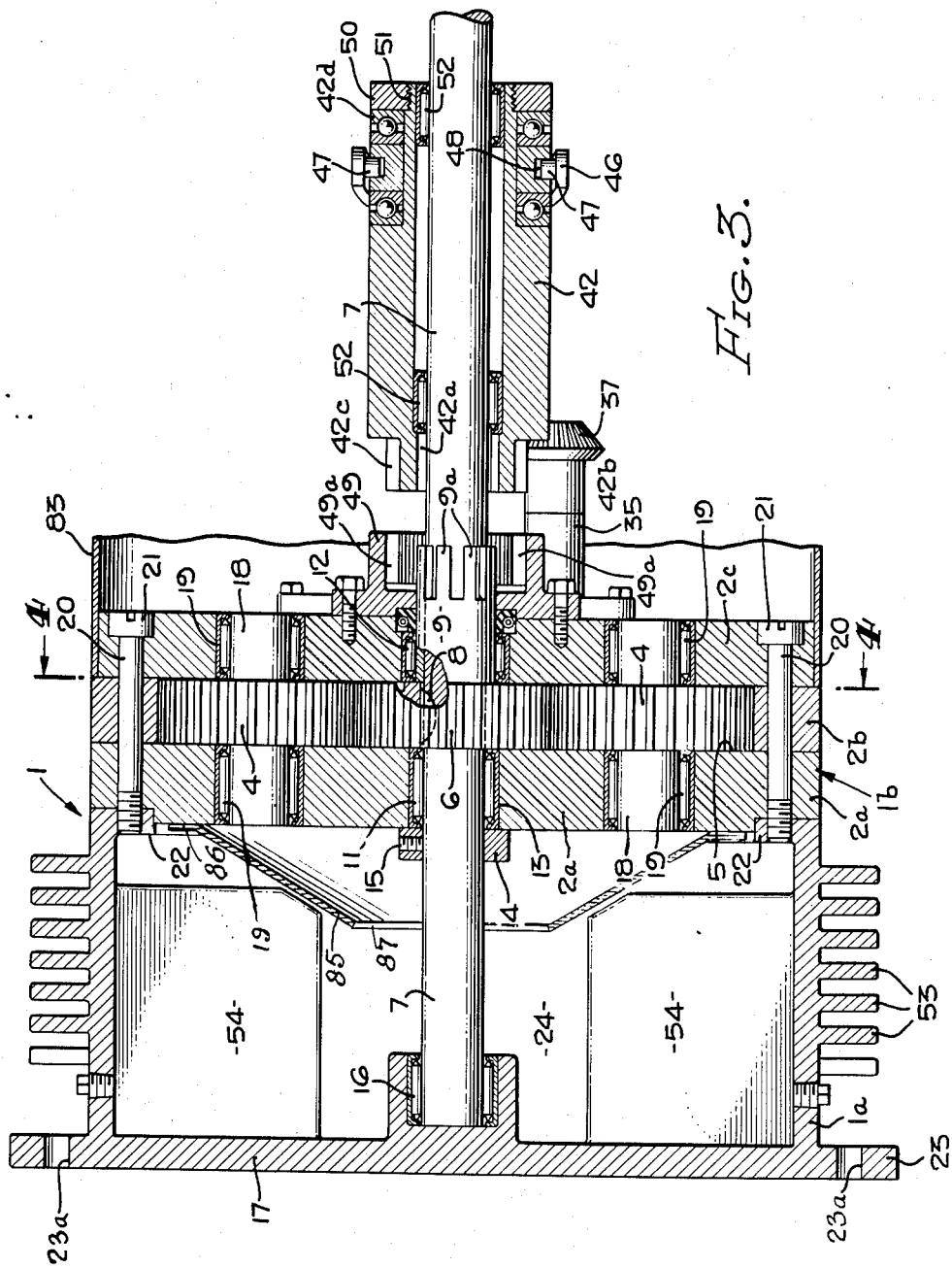
Fig. 3 is a substantially horizontal section taken along the line 3—3 of Fig. 2.
Figure 6:
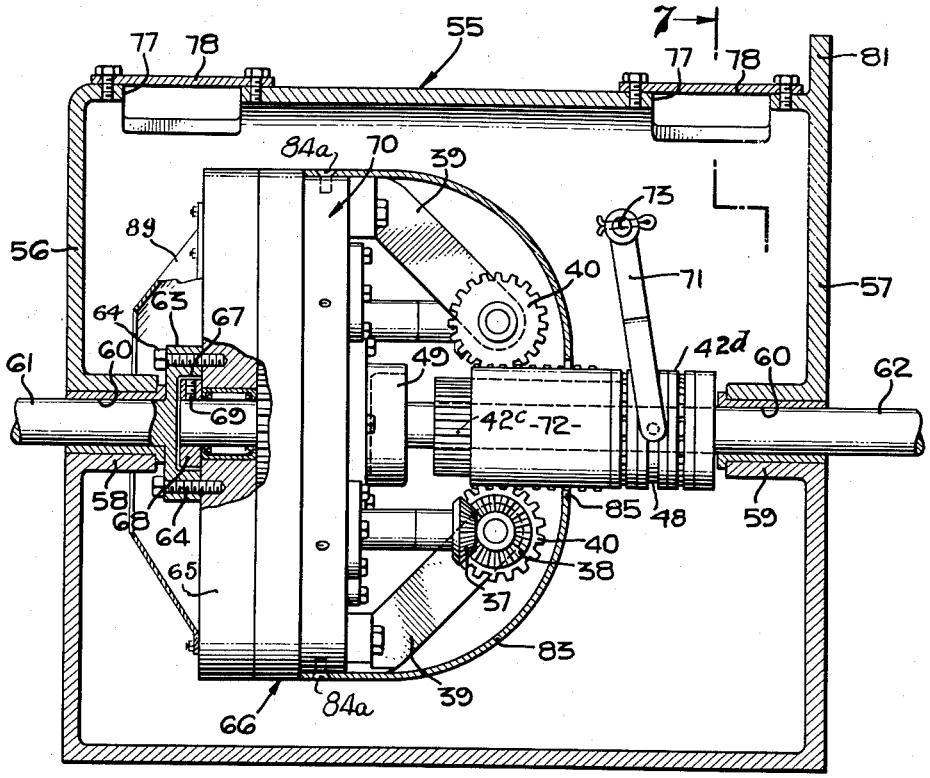
Figure 7:
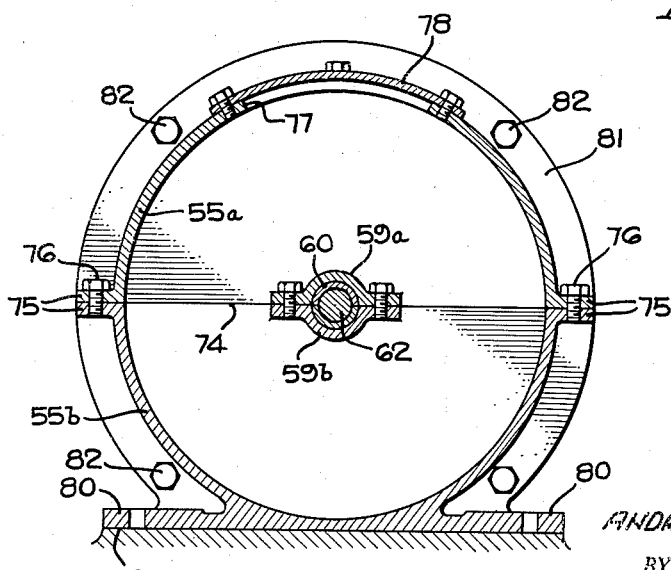

Figs. 6 and 7 illustrate a modification of the casing construction that may be used if desired to enable the entire casing illustrated in Figs. 1 to 3 to be enclosed in an outer casing or housing, having features of construction that enable it to be used as a floating casing, as illustrated in Fig. 3, capable of being attached to the flange of a driving member, and equally capable of being supported in a fixed position, either bolted to a horizontal bed or seat, as illustrated in Fig. 7, or to a vertical face or seat. In these views, Fig. 6 is a longitudinal section taken in a substantially vertical plane, certain parts being broken away at the left to illustrate the means for connecting the driven shaft at the left to the inner casing that carries the transmission mechanism. Fig. 7 is a vertical cross section taken about on the line 7—7 of Fig. 6.

Referring more particularly to the parts as illustrated in Figs. 1 to 4 inclusive, the casing 1 preferably includes a reservoir section in the form of a drum 1a and a pump housing section 1b, the latter of which, in the present instance, is composed of three relatively thick plates 2a, 2b and 2c. The plate 2a is provided with perforations that form chambers to receive flow resistance devices for controllably resisting the flow of oil. For this purpose I prefer to employ pumping mechanism. While this pumping mechanism could include small reciprocating pumps, I prefer to employ a pump or pumps of rotary type. It is preferable to employ a plurality of such pumps spaced equidistant from each other circumferentially about the axis 3. This makes for perfect balance regardless of how many pumps are employed. For the purpose of illustration, the drawing shows two such pumps. Any part accessory to each of the pumps is balanced by a similar part identical in construction and weight, located at the same distance from the axis 3. This, of course, preserves the balance which is essential in such a structure rotating as it must, often at high speeds.

Figure 4:
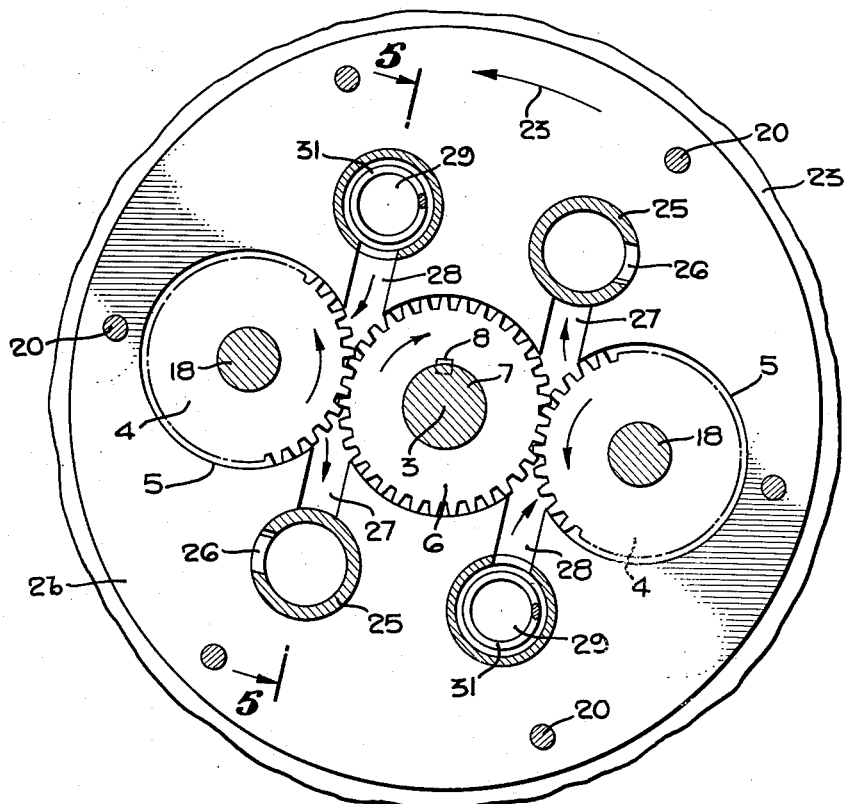
Fig. 4 is a cross section taken about on the line 4—4 of Fig. 3, particularly illustrating the general arrangement of the impelling mechanism and the valves that control the action of the transmission in starting up the driving of the load, and decelerating the movement of the load when the transmission mechanism is running in a reversed direction.

As illustrated in Fig. 4, the two pumps I employ are of gear type, each including a gear wheel 4 mounted to rotate in a circular perforation constituting a pump chamber 5 in which the gear wheel 4 revolves in its planetary movement about a center gear wheel or sun-gear 6 that is rigidly keyed to a driven shaft 7 as at 8 (see Fig. 3).

As indicated in Fig. 3, the right end of this gear wheel 6 abuts against a shoulder which is the end of a large neck 9 on the shaft 7. The neck 9 may be integral with the shaft, but in Fig. 3 is shown as a sleeve shrunk on to the shaft. The shaft 7 is mounted in two main bearings 11 and 12 in bores 13 formed in the plates 2a and 2c, that keep the shaft from shifting. Each has a set screw 15, mounted in a collar 14.

The left end of the shaft 7 is centered in a roller bearing 16 socketed against the inner face of the head 17 of the aforesaid drum 1a.

The pump gears 4 have tight shafts 18 rotating in roller bearings 19. The plates 2b and 2c are clamped up against the end of the drum section 1a by means of through-bolts 20 with countersunk heads 21 let into the plate 2c; and the inner ends of which are threaded into a flange 22 on the adjacent end of the drum section 1a of the casing.

In order to drive the casing, its left end may be provided with a flange 23 having bolt holes 23a for bolts to attach it to a driving collar C (shown in dotted lines in Fig. 1) from a source of power such as a prime-mover of any kind, for example, a steam engine, gas engine or the like.

Figure 5:
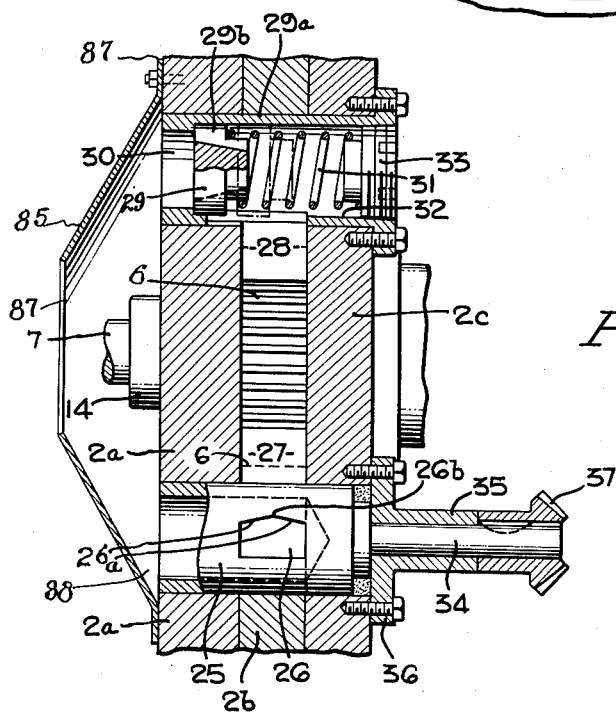
Fig. 5 is a section taken on the line 5—5 of Fig. 4 and further illustrating one of the outlet valves that functions to control the starting torque, and the other valve referred to that enables the transmission mechanism to develop a braking effect when desired.

Referring now to Figs. 4 and 5, valve-means is illustrated for controlling the effective area of flow for oil driven by the pump gears 4 into the oil chamber 24 within the drum 1a. I prefer to employ a separate valve 25 corresponding to each pump gear, and these valves are preferably rotary valves of tubular form, each having a port 26 in its side wall, and each tubular valve 25 is open on its inner end to deliver oil into the oil reservoir 24 via a duct 27, taking oil from an inlet duct 28, and taking oil through the inlet valve 29 through inlet port 30 communicating with the oil reservoir 24. Each inlet valve 29 is spring-loaded by its corresponding coil spring 31, housed in the bore 32 of the valve casing 29 and backed up by a threaded follower plug 33.

In order to rotate the valves to adjust them to the same degree of opening each valve 25 is formed with a reduced stem 34, as illustrated in Fig. 5, mounted for rotation in a bearing sleeve 35 provided with a flange 36 for attaching it to the outer face of the plate 2c by small bolts. Each stem 34 carries a bevel gear 37 (see Fig. 2) meshing with a bevel gear 38 supported in the end of a bracket arm 39, and the shaft of each bevel gear 38 carries a pinion 40 keyed to it; and these pinions mesh with racks 41 respectively. These racks are mounted in "key-seat" grooves 41a extending longitudinally in opposite faces of a shiftable sleeve 42.

The sleeve 42 is freely rotatable and freely shiftable on the shaft 7. Any suitable means may be employed for shifting the sleeve 42 to adjust the valve closures 25 to control their effective area of opening for flow of the oil driven through them by the pumps. In other words, by shifting the sleeve inwardly toward the casing the valve-closures 25 will become further closed and develop an increased choking effect on the oil currents passing through the valve. This will increase the torque transmission and acceleration of the driven shaft.

In the present instance a lever 43 is provided supported on a fulcrum pin 44 on a fixed part 45. A yoke 46 on the inner end of the lever has the usual pins, such as pin 47, that engage in a circumferential groove 48 in the sleeve.

As the sleeve is approaching its extreme position toward the left, the valves 25 will finally become completely closed, and when they do so no oil can pass through them. Then the pumps individually will cease to move but will rotate about the axis 3 as though their parts were all fixed to the casing. When that occurs the drive ratio will be one-to-one. Also, in accordance with my invention, means are provided operating to effect a positive clutch connection into the drive so that the drive then becomes independent of the oil pumps. Any suitable means may be employed to do this, but as illustrated in Fig. 3, I provide correlated means on the tight sleeve 9 and on the adjacent end of the casing section 1b for interlocking them together directly through the sleeve end. In the present instance I form the outer end of the tight sleeve with a plurality of equidistant splines 9a. Similar equidistant "splines" or ribs 42a are formed on the end of the sleeve 42, that nest into the sockets between the splines 9a.

On the exterior of the sleeve 42 at this end, its cylindrical wall 42b is provided with outwardly projecting ribs 42c that are received in the spaces in a socket piece 49 having a chamber, the wall of which is formed with clutch teeth 49a; the ribs 42c slide into the spaces between them when this positive clutch is established. Internal gear 49 is made slightly longer than the splines 9a so as to guide the two clutch parts into perfect alignment with each other as the clutch is closing.

Referring again to Fig. 3, if desired, the outer end of the sleeve 42 may be mounted on a double roller bearing 42d backed up by a follower 50 attached to the reduced threaded end 51 of the sleeve.

The end faces of the pinions 40 are preferably let down slightly into the "key-seat" grooves 41a, as indicated in Fig. 2, so as to keep the rack teeth in alignment with the pinions to sleeve 42 is also preferably mounted on ball bearings or roller bearings 52 on the shaft 7 so as to reduce wear, and also to reduce frictional resistance when the sleeve is shifted longitudinally on the shaft.

Referring now to Fig. 5, and particularly to the ports 26 in the tubular valves 25, I prefer to form the closing edge of each valve so that it is composed of two sections 26a that are disposed at a slight inclination to each other and which intersect about on the median line or plane midway between the ends of each port. This is the edge at which the oil is finally cut off in its flow from the pumps towards the reservoir. By giving this edge the form indicated, it does not cut off flow of all the oil at one instant, but it gradually reduces the flow of oil through each port after the outer end portions of the inclined edges arrive at the edge of the duct 27 where the oil is being cut off. As the movement of the valve continues beyond this point, a smaller and smaller quantity of oil can flow through until the peak 26b of the port finally arrives at the cut-off edge of the duct 27. This form of cut-off edge for the ports 26 is very advantageous because it enables the operator of the transmission mechanism to set the valves into a position where there is a very slight difference in the speed of rotation of the casing and that of the driven shaft; while this condition exists, the sleeve can be moved further into its extreme position toward the left, which will bring the clutch members 42b and 42d into mesh.

If the transmission mechanism is used under conditions where there is a tendency for the oil in the chamber 24 to become heated, the exterior of the drum 1a may be provided with a plurality of circumferential fins 53, the lateral surface of which will greatly increase the superficial area of the drum and enhance the speed of transmission of heat to the atmosphere from the drum. Furthermore, in order to facilitate the development of pressure in the oil within the chamber, I may provide the circumferential wall of the drum section 1a with a plurality of fins, such as the fins 54 which project radially inwardly, and the side faces of these fins, of course, would cause the oil in the drum section 1a to take up the angular velocity of the drum itself. Hence the centrifugal force acting on the oil will develop considerable static pressure in the portion of the oil that is located toward the peripheral wall of the drum in the vicinity of which the open ends of the valves 29 are located.

Referring now to Figs. 6 and 7, it should be stated that these figures illustrate an embodiment of the invention in which the mechanism already described and illustrated in Figs. 1 to 5 inclusive is all housed in an outer casing 55. This casing has integral end walls or heads 56 and 57 which may be formed with integral naves or hubs 58 and 59, the former of which is provided with a bushing 60 that operates as a bearing for a drive shaft 61, and the latter of which is provided with a smaller bushing that operates as a bearing for the driven shaft 62. If desired, these bushings 60 may be provided with ball bearings or roller bearings. The shaft 61 may be provided with a rigid collar at its inner end beyond the bearing. For example, it may be provided with an integral collar 63 provided with machine bolts 64 for attaching the collar to a plate 65 of the casing 66 that corresponds to the plate 2a. As presently illustrated, the collar or flange 63 may be provided with a counterbore 67 to receive a collar 68 that is secured rigidly by any means, such as a set screw 69, to the forward end of the driven shaft 62.

In other respects the construction of this transmission unit 70 is substantially identical with that illustrated in Figs. 1 to 5. By "transmission unit" I refer particularly to the mechanism within the casing 66 that actually effects the reduction in the driving ratio between the shafts 61 and 62. In this case, however, the mounting for the lever 71 that shifts the control sleeve 72 is by means of a stub shaft 73, an operating lever for which is disposed on the outer side of the side wall of the outer casing through which the shaft 73 extends.

In this embodiment of the invention oil retaining rings, not illustrated, would be provided, associated with the bearings or bushings at 60.

As illustrated in Fig. 7, the outer casing 55 may be formed in two separable sections 55a and 55b, the adjacent edges of which abut against each other on a diametrical plane illustrated, on the line 74. The bearings or naves 59 are also preferably split along this line 74 into two sections 59a and 59b that correspond respectively to the two sections of the casing.

The two sections of this casing also should be provided with outer flanges 75 which abut against each other and which are secured together by machine bolts 76.

The wall of the casing 55 for practical reasons should be provided with two large access openings 77 closed by suitable arcuate covers 78. One of these openings is preferably located at a point near the shaft 73, so as to give access to the lever 71 and the parts associated with it.

These access openings also may be used for dumping the oil bath after the same has been employed beyond its condition of usefulness. They also facilitate flushing and cleaning out the interior of the outer casing and also the inner casing, as the same is preferably constructed so as to admit access of the surrounding oil bath into the interior of the transmission mechanism where it fills all of the pump ports and passages.

In this embodiment of the invention, illustrated in Figs. 6 and 7, I prefer to provide means whereby the outer casing may be mounted upon a substantially horizontal seat face, such as illustrated by the line 79, for which purpose the body of the casing would be provided with two laterally projecting flanges 80. Furthermore, if desired, either one of the end walls or heads 56 and 57 may be provided with a projecting flange 81 which would enable the housing or outer casing 55 to be secured to a vertical face or seat by means of bolts 82.

In practice the gearing, including the inner end of the sleeve 42 and the pinions that are moved thereby, are preferably all enclosed in a hood 83 which is in the form of a dome shaped bonnet, the edge 84 of which may be slipped over the end plate 2c and secured thereto by small machine screws 84a as indicated. The dome or middle portion of this hood is provided with an opening 85 that is large enough to permit free movement of the sleeve through the same. In the embodiment illustrated in Figs. 6 and 7, this opening 85 permits oil in the interior of the casing 55 to flow freely into contact with the pinions and bevel gears that impart the adjusting movement from the control sleeve to the valves 25.

In the operation of this transmission apparatus it should be understood that when the valves 25 are in their full open positions, the oil will be received by the pumps from the inlet valves 29 and through the inlet ports 28 into the pumps and circulated by them outwardly through the passages 27 to the valves 25. These valves 25 would be normally open and would permit free movement of the oil through them and back through their tubular bodies into the reservoir. When it is desired to start the drive through the transmission, this would be accomplished by operating the lever 43 (see Fig. 1) to shift the sleeve 42 inwardly. This inward shifting movement would be gradual so as to develop more or less slowly the resistance developed by the pumps. As the effective opening for flow through or past the valves 25 decreases, the flow of oil will be progressively choked at those points. This will, of course, increase the resistance and increase the amount of torque that is imparted to the shaft 7 (see Fig. 3). As the shaft 7 picks up speed, the sleeve 42 would be shifted further and further toward the left, each corresponding movement increasing the resistance developed by the pumps until finally when the flow of oil is substantially choked off completely through the pump, the main gear or sun-gear 6 will cease to rotate independently of the casing. At this moment it will have substantially the same angular velocity as the casing 1. This will occur substantially at the moment that the left end of the sleeve 42 arrives in line with the outer end of the socket 49. Any further movement will cause the outer clutch, including the ribs 42c and 49a, to mesh. This will bring the ribs 42c and the gaps between the splines 9a into alignment and further movement will effect a closing of the clutch at this point, after which positive transmission will be established from the casing 1 to the driven shaft 7.

By reason of the presence of a considerable amount of oil in the reservoir (which should be substantially full of oil at all times), the heat that is acquired by the oil in passing through the valves and the pumps, becomes transferred to the walls of the reservoir, and the heat of its walls is reduced by the presence of the radiator fins 53. Also by reason of the presence of the radial fins 54 on the interior of the drum that carries the oil, there is some slight resistance developed due to the inertia of the oil when the casing starts to rotate, but this inertia is not as great as the inertia of a rigid metal fly wheel all parts of which are immediately accelerated at starting. However, when the casing is rotating at the normal running speed of the shaft 7 the momentum of the casing with its contained oil is considerable because the oil is rotating as a mass at the same speed as the casing itself. This mass of oil has an effect as a moving mass very closely approximating momentum effect of an ordinary fly wheel of the same dimensions as the drum of oil. This effect is accentuated by the centrifugal force acting upon the body of oil which forces the oil radially outward, against the inner face of the side wall of the drum. In other words, it has more or less the effect of "crowding" the oil into the space between the blades or fins 54 and that develops lateral pressure against them which resists relative rotation of the drum with respect to the oil contained in it.

In practice where the transmission must be used for imparting motion in either direction to a driven shaft, a reversing gear mechanism should be employed driven by the drum shaft 7.

When this transmission mechanism is employed in an automobile or other vehicle to drive its differential mechanism by means of the driven shaft 7, the transmission mechanism described herein may be used to develop a braking effect when the vehicle is running down hill. This can be accomplished by leaving the sleeve 42 in an intermediate position with the valves 25 partially open, and also letting the motor idle that drives the casing 1. With that relation of the parts the shaft 7 will be rotated forwardly by the rolling car, as it will be rotating faster than the idling casing 1; the effect will be established of reversing the direction of the sun gear 6. This will drive the pumps in a reverse direction and force liquid through the ducts 28 to the backs of inlet valves. This will hold them there on their seats and permitting restricted flow through their ports 29b into the reservoir. This will offer considerable resistance and give a braking effect to the rolling car.

Now it should be realized that the actual braking effect due to the driving of a reciprocating 4-stage gasoline engine is considerably reduced by the fact that resistance arising from compressing intake air in a cylinder is immediately followed by an accelerating effect when the same air expands in the outstroke of the piston.

A braking effect can also be attained by shifting the sleeve 42 so that its teeth 42c engage the teeth of the socket piece 49. This locks the shaft 7 to the motor in the car, and of course develops a certain amount of braking effect.

At other times, when the transmission mechanism is in operation, the mass of its rotating parts enable it to perform the function of a fly wheel.

In order to insure that there will be an ample supply of liquid passing through the inlet or inlets into the actuating means such as the pumps I have described, when the mechanism is rotating at a high R. P. M. I provide means in the chamber 24 for utilizing the centrifugal force acting on the liquid, to direct it into the inlet or inlets for the pumps.

For this purpose I prefer to employ a deflector 85 (see Figs. 3 and 5) in the form of a conical shell. The large end of this cone is of sufficient diameter to operate as a hood encompassing the inlets for valves 29. This cone has a flange 86 at its large end illustrated as bolted to the adjacent face of the plate 2a. The cone is truncated so that its outer end has a large opening 87 into it. In the present instance I prefer to make the opening 87 of approximately the same diameter as the sun gear 6.

In a transmission of this type some friction is developed in the pump gears and also in the choked valves by friction developed in the liquid passing through them with restricted flow. This, of course, has the effect of raising the temperature of the liquid. The circumferential fins 53 radiate the heat from the wall of the drum where the reservoir is located thereby reducing the temperature of the mass of oil, or other operating liquid in the reservoir and keeping down the temperature of the meshing gears.

When the drum 1a is rotating at a high speed the liquid flows in through the opening into the cone and the liquid in the cone is "crowded" out into the angular spaces at 88 (see Fig. 5) where pressure is built up in the liquid. This hydrostatic pressure insures an ample supply of liquid to the valves and also causes flow at a high velocity through the inlet valves 29 whenever they are open.

In Fig. 6 I illustrate a similar truncated cone 89, that functions in the same way as the cone 85.

The presence of this cone is particularly advantageous where the inlets are located in a place or position that enables the centrifugal force to act in a way that would prevent free flow of the liquid into the inlets of pumps in such apparatus.

It is important that I provide a single reservoir in which all of the operating liquid is located, that is not located in the pump chamber of the casing, and that a considerable quantity of the volume of liquid in the reservoir 24 fills the interior of the cone or conical deflector 85 the large diameter of which is not much less than the inner diameter of the circumferential wall of the reservoir. Hence, the liberal supply of the operating liquid is constantly moving out of by centrifugal action toward the inlet valves 29 which are at a considerable distance from the axis of the shaft 7 as shown in Figure 4. As the liquid of considerable mass is moving outwardly toward the edge of the cone 85, the wall of the cone converging as it does toward the wall 2a that carries the inlet valves actually gives the impetus of the oil into the valves. If this cone were not present the operating liquid adjacent to the wall 2a would move outwardly at a high speed past the inlet valves.

Many other embodiments of the invention may be resorted to without departing from the spirit of the invention.

I claim as my invention:

1. In a variable speed transmission apparatus, the combination of a casing in the form of a cylindrical drum, a pump housing in the casing with a transverse end wall extending completely across the diameter of said drum from wall to wall thereof, and forming a reservoir occupying more of the length of said drum than said pump housing, so that it contains a relatively large mass of the operating liquid, means for maintaining a pool of the liquid completely filling the said reservoir on the other side of said end wall, the outer side of said reservoir at its cylindrical wall having circumferential radiating fins for cooling the drum and the liquid in the reservoir a plurality of oil pumps in said pump housing with inlets to the same through said end wall, hood-means in the reservoir having an inclined wall adjacent to said end wall for directing the centrifugally moving oil adjacent said end wall into said inlets tubular rotary outlet valves having open ends at said end wall receiving oil from the pumps and having ports through their side walls delivering the oil from the pumps back to the reservoir, a gear wheel co-axial with the casing connected to the pumps for driving the same, means connected coaxially to the outer end of the drum for rotating it at a high velocity a driven shaft also mounted co-axially with respect to said casing, a sleeve mounted on said shaft for free rotation with respect to the shaft, and for shifting movement on said shaft, means connecting said sleeve to said tubular valves for rotating the same, including a part rotating with the casing engaging the sleeve and causing the sleeve to rotate with the casing, a control member for shifting said sleeve capable of moving the tubular valves progressively from their full open position toward a position in which the flow through the valves to the reservoir is more restricted so as to transmit rotation through the apparatus at a gradually increased speed.

2. In a variable speed transmission apparatus, the combination of a cylindrical casing mounted so as to be capable of being power driven on its own axis at a relatively high speed, a pump-housing in the casing with a transverse end wall, means for maintaining a single oil reservoir on the outer side of said end wall containing all the oil that is not contained in the pump housing, a plurality of oil pumps in said pump-housing with inlets into the same to pass oil from the reservoir through the said end wall into the pump-housing, deflector means in the reservoir presenting an inclined wall adjacent the face of said end wall for directing centrifugally moving oil adjacent said end wall, into said inlets, tubular outlet valves mounted within said housing having side ports receiving oil from said pumps, and having open ends emerging into said reservoir adjacent said end wall for delivering oil back to the reservoir, a gear wheel coaxial with the casing connected to the pumps for driving the same, a driven shaft mounted coaxially with respect to said casing, rotated by the pumps, a sleeve mounted on said driven shaft capable of shifting along the shaft, means for shifting said sleeve, and means for connecting said sleeve to said outlet valves for controlling the flow of oil from the pumps.

3. A fluid transmission of the gear-pump type having a drive shaft, a plurality of gear pumps symmetrically disposed around the axis of the drive shaft, a casing including a single reservoir for operating fluid, and enclosing said gear pumps, said reservoir containing all the operating fluid that is not contained in the gear-pump casing, a truncated cone of shell form with its larger end disposed toward said gear pumps, and carried within said reservoir co-axially with said driving shaft, the smaller end of said cone providing a fluid inlet for fluid moving within the cone toward said pumps, said pumps having inlets within the perimeter of the large end of said cone; said pumps having outlets to the reservoir, and valve means for regulating the flow of fluid through said outlet.

4. A fluid transmission of the gear-pump type according to claim 3, including a driving gear for the pumps coaxial with said casing, and in which the inlet opening at the smaller end of the cone is smaller than said driving gear, substantially.

5. In a variable speed transmission apparatus, the combination of a casing in the form of a cylindrical drum, a pump housing in the casing with a transverse end wall extending completely across the diameter of said drum from wall to wall thereof, and defining a reservoir space occupying more of the length of said drum than said pump housing, means for maintaining a pool of liquid completely filling the said reservoir on the other side of said transverse end wall, a plurality of oil pumps in said pump housing with inlets to the same through said end wall, hood-means in the reservoir having an inclined wall adjacent said end wall for directing the oil that moves outwardly adjacent said end wall by centrifugal force, into said inlets, tubular rotary outlet valves having open ends at said end wall receiving the oil liquid from the pumps, and having ports through their side walls delivering the oil from the pumps back to the reservoir, a gear wheel co-axial with the casing connected to the pumps for driving the same, means connected co-axially to the outer end of the drum for rotating it at a high velocity, a driven shaft also mounted co-axially with respect to said casing, a sleeve mounted on said shaft for free rotation with respect to the shaft, and for shifting movement on said shaft, means connecting said sleeve to said tubular valves for rotating the same, including a part rotating with the casing, engaging the sleeve and causing the sleeve to rotate with the casing, a control-member for shifting said sleeve capable of moving the tubular valves progressively from their full open position toward a position in which the flow through the valves to the reservoir is more restricted so as to transmit rotation through the apparatus at a gradually increased speed; said means for maintaining the said pool of liquid including an outer casing within which the pump housing lies, said outer casing having an oil chamber therein containing oil immersing the said housing and the transmission mechanism, said outer casing having a seat face for mounting the same on a supporting seat, the means for rotating the drum including a drive-shaft extending through an end wall of said outer casing, having its bearing therein, and connected to the transmission mechanism for driving the same.

6. In a variable speed transmission apparatus, the combination of a casing in the form of a cylindrical drum, a pump housing in the casing with a transverse end wall extending completely across the diameter of said drum from wall to wall, thereof, and defining a reservoir occupying more of the length of said drum than said pump housing, means for maintaining a pool of liquid completely filling the said reservoir on the other side of said transverse end wall, a plurality of oil pumps in said pump housing with inlets to the same through said end wall, hood-means in the reservoir having an inclined wall adjacent said end wall for directing the oil that moves outwardly adjacent said end wall by centrifugal force, into said outlets, tubular rotary outlet valves having open ends on said end wall receiving the oil liquid from the pumps, and having ports through their side walls delivering the oil from the pumps back to the reservoir, a gear-wheel co-axial with the casing connected to the pumps for driving the same, means connected co-axially to the outer end of the drum for rotating it at a high velocity, a driven shaft also mounted co-axially with respect to said casing, a sleeve mounted on said shaft for free rotation with respect to the shaft, and for shifting movement on said shaft, means connecting said sleeve to said tubular valves for rotating the same, including a part rotating with the casing, engaging the sleeve and causing the sleeve to rotate with the casing, a control-member for shifting said sleeve capable of moving the tubular valves progressively from their full open position toward a position in which the flow through the valves to the reservoir is more restricted so as to transmit rotation through the apparatus at a gradually increased speed; said tubular valves including valve closures with ports therein respectively through which the liquid flows, said ports having a pair of cut-off edges extending throughout the length of the port and disposed in an inclined direction with respect to the co-operating edge of the tubular valves' ducts that determines the effective area through which the liquid flows from each valve, thereby causing the gradual cut-off of the liquid passing through the ducts as the ratio of transmission of the drive approaches a one-to-one ratio, said means for maintaining the said pool of liquid including an outer casing within which the pump casing lies, said outer casing having an oil chamber therein containing oil immersing the said housing and the transmission mechanism, said outer casing having a seat face for mounting the same on a supporting seat, the means for rotating the drum including a drive-shaft extending through an end wall of said outer casing, having its bearing therein and connected to the transmission mechanism for driving the same.

7. A variable speed transmission apparatus according to claim 6, in which the end of said driven shaft projects beyond the forward end wall of the drum; and including a collar secured to the projecting end of the driven shaft and seating at the forward end of the drum.

8. In a mechanism of the kind described mounted between a driving member and a driven member, the combination of a casing, liquid-actuated means in the casing connected into the drive from the driving member to the driven member functioning to control the imparting of the driving movement to the driven member, said casing having a cylindrical drum with a transverse end wall and a second inner transverse wall, extending completely across the diameter of the drum from wall to wall thereof and forming a single chamber for the operating liquid in said drum, said second wall separating the liquid operated means from said chamber, said drum mounted for rotation at a high speed capable of developing centrifugal force, said liquid-actuated means having an inlet for inducting the liquid from said chamber, and means including a deflector carried on said second wall in the chamber for directing the liquid moving outwardly under the action of the centrifugal force, into said inlet.

9. Mechanism according to claim 8 including a plurality of liquid-actuated means, having two inlets from the said chamber located in the face of the said second wall; and in which the said deflector presents a surface converging toward the face of said wall toward the periphery of the drum and encompasses the said inlets.

10. Mechanism according to claim 8 including a plurality of pumps having respective inlets in the said second wall; and in which the deflector is substantially of truncated cone form with the large end thereof secured to the said transverse wall and encompassing the said inlets so as to direct liquid outwardly toward said inlets.

11. In a variable speed transmission apparatus, a pump casing comprising three plates co-extensive with each other, superposed in succession on each other, and secured together, including two outer plates and an intermediate plate between the same, said intermediate plate having a circular opening passing completely through the plate and constituting a main chamber, a pump driving gear wheel mounted in said chamber, a drum casing secured to the outer side of one of said outer plates, having an oil reservoir of considerable volume within the same, a pair of diametrically opposite circular openings passing completely through the intermediate plate forming two gear chambers, gear wheels mounted in said last named openings, respectively, and driven thereby, a pair of inlets taking oil from the reservoir and delivering the same respectively to said last named gear wheels, and a pair of outlets taking oil from said pair of gear wheels and delivering the same into the reservoir, with outlet valves controlling the flow through said outlets; said intermediate plate having circular chambers passing completely through the same to house said pump gears, said inlets and outlets being in the form of slots constituting ducts, extending completely through said intermediate plate, each outlet duct being in substantial alignment with the corresponding inlet duct that serves the same gear pump.

References Cited in the file of this patent

UNITED STATES PATENTS

| Number | Name | Date |
|---|---|---|
| 873,621 | Schwarz | Dec. 10, 1907 |
| 979,272 | Feller | Dec. 20, 1910 |
| 1,030,463 | Crane | June 25, 1912 |
| 1,307,488 | Durant | June 24, 1919 |
| 2,066,450 | Bascle et al. | Jan. 5, 1937 |
| 2,086,889 | Anderson | July 13, 1937 |
| 2,418,625 | Cornelius | Apr. 8, 1947 |
| 2,482,313 | Boscle | Sept. 20, 1949 |
| 2,550,373 | Ortloff et al. | Apr. 24, 1951 |
| 2,644,561 | Dikeman | July 7, 1953 |